(12) United States Patent
Joye

(10) Patent No.: US 7,639,796 B2
(45) Date of Patent: Dec. 29, 2009

(54) METHOD FOR SECURE INTEGER DIVISION OR MODULAR REDUCTION AGAINST HIDDEN CHANNEL ATTACKS

(75) Inventor: Marc Joye, Saint Zacharie (FR)

(73) Assignee: Gemalto SA, Meudon (FR)

( * ) Notice: Subject to any disclaimer, the term of this patent is extended or adjusted under 35 U.S.C. 154(b) by 520 days.

(21) Appl. No.: 10/537,300

(22) PCT Filed: Dec. 11, 2003

(86) PCT No.: PCT/FR03/03681

§ 371 (c)(1),
(2), (4) Date: Jun. 2, 2005

(87) PCT Pub. No.: WO2004/055665

PCT Pub. Date: Jul. 1, 2004

(65) Prior Publication Data

US 2006/0023873 A1 Feb. 2, 2006

(30) Foreign Application Priority Data

Dec. 11, 2002 (FR) .................................. 02 15623

(51) Int. Cl.
*H04L 9/00* (2006.01)
*G06F 11/30* (2006.01)

(52) U.S. Cl. ............................. 380/28; 380/29; 380/30; 713/193; 713/194

(58) Field of Classification Search ................... 380/28
See application file for complete search history.

(56) References Cited

U.S. PATENT DOCUMENTS 5,077,793 A * 12/1991 Falk et al. ..................... 380/28
2003/0079139 A1* 4/2003 Drexler et al. ............... 713/193

FOREIGN PATENT DOCUMENTS

| DE | 199 63 407 | 7/2001 |
|----|------------|--------|
| EP | 0 682 327  | 11/1995 |

\* cited by examiner

*Primary Examiner*—Longbit Chai
(74) *Attorney, Agent, or Firm*—Buchanan Ingersoll & Rooney PC

(57) ABSTRACT

The invention concerns a cryptographic method which includes integer division of the type q=a div b and/or a modular reduction of the type r=a mod b, with q being a quotient, a being a number of m bits, b being a number of n bits, n being not more than m and $b_{n-1}$ being the most significant bit of the number b. The number a is masked by a random number p before performing the integer division and/or the modular reduction. The invention also concerns an electronic component for implementing the method. The invention is applicable for making smart cards secure against hidden channel attacks, and in particular differential attacks.

7 Claims, No Drawings

METHOD FOR SECURE INTEGER DIVISION OR MODULAR REDUCTION AGAINST HIDDEN CHANNEL ATTACKS

This disclosure is based upon French Application No. 02/15623 filed Dec. 11, 2002, and International Application No. PCT/FR2003/003681, filed Dec. 11, 2003, the contents of which are incorporated by reference.

BACKGROUND OF THE INVENTION

The invention concerns a method of integer division or modular reduction secure against covert channel attacks, and in particular differential attacks. The invention can be used for performing division operations in a more general cryptographic method, for example a secret or public key cryptographic method. Such a cryptographic method can for example be implemented in electronic devices such as chip cards.

The security of cryptographic methods lies in their ability to keep concealed the confidential data or data derived from confidential data that they manipulate.

A malevolent user may possibly undertake attacks aimed as discovering in particular confidential data contained and manipulated in processing operations performed by the calculation device executing a cryptographic method.

Amongst the best known attacks, simple or differential covert channel attacks can be cited. Covert channel attack means an attack based on a physical quality measurable from outside the device and whose direct analysis (simple attack) or analysis according to a statistical method (differential attack) makes it possible to discover data manipulated in processing operations performed in the device. These attacks have in particular been disclosed by Paul Kocher (Advances in Cryptology—CRYPTO'99, vol. 1666 of Lecture Notes in Computer Science, pp. 388-397. Springer-Verlag, 1999).

Amongst the physical quantities that can be used for these purposes, the execution time, the current consumption, the electromagnetic field radiated by the part of the component used for executing the calculation, etc, can be cited. During the execution of a method, the manipulation of a bit, that is to say its processing by a particular instruction, leaves a particular imprint on the physical quantity in question, according to the value of this bit and/or according to the instruction. In other words, the trace (that is to say the change over time of the physical quantity in question) left by the component executing the method is different depending on whether a bit equal to one or a bit equal to zero is being manipulated. Covert channel attacks are based on this weakness of cryptographic methods.

The cryptographic methods using as a basic operation a modular exponentiation operation of the type $Y=X^D$, X, Y and D being integer numbers, have been very widely studied during the past few years. By way of example, the RSA method, the key exchange according to Diffie-Hellman or the DSA signature method can be cited. Significant progress has been made in protecting these methods against covert channel attacks.

On the other hand, no study has been made on making secure cryptographic methods using as an elementary operation an integer division of the type q=a div b and r=a mod b, a and b being two operands, q and r being respectively the quotient and the remainder of the integer division of a by b. a and/or b are secret data, for example elements of a key of the method. For example, the method of Barrett (P. Barret, "Implementing the RSA public key encryption algorithm on a standard digital signal processing", vol 263 of Lecture Notes in Computer Science, pp. 311-323, Springer Verlag, 1987), the method of Quisquater (U.S. Pat. No. 5,166,978, November 92) or the RSA method implemented according to the Chinese remainder theorem (J J Quisquater and C Couvreur, "Fast decipherment algorithm for RSA public key cryptosystem", Electronics Letter, vol 18, 99. 905-907, October 1982) are cryptographic methods using an integer division as an elementary operation.

Such cryptographic methods using an integer division method and/or a modular reduction method are sensitive to covert channel attacks, as will be seen in the following example.

A known method for using both an integer division and a modular reduction is the so called "paper/pencil" method. This method in practice repeats the method used when such an operation is performed by hand. This method is set out below.

Given two data items $a=(a_{m-1}, \ldots, a_0)$ of m bits and $b=(b_{n-1}, \ldots, b_0)$ of n bits, n less than or equal to m and $b_{n-1}$ γ O, the so called "paper/pencil" division method calculates the quotient q=a div b and the remainder r=a div b. For this purpose, the method successively performs several division of an integer A of n+1 bits by the integer b of n bits. It is necessary in practice to have 0 [A/b <2, which is the case whenever $b_{n-1}$ γ 0.

The remainder r is a number of no more than n bits since r<b. The quotient q for its part is a number of no more than m−n+1 bits since q=a div b [a div $(b_{n-1}*2^{n-1})$=a div $2^{n-1}$= $(a_{m-1}, \ldots, a_{n-1})$ since b µ $b_{n-1}*2^{n-1}$ and $(a_{m-1}, \ldots, a_{n-1})$ is a number of m−n+1 bits. At the end of the division method, the quotient q is stored in the m−n+1 least significant bits of the register containing initially the number a. The most significant bit of the remainder r is stored in 1-bit register used as a carry during the calculation and the n−1 least significant bits of the remainder r are stored in the n−1 most significant bits of the register initially containing the number a.

As this work is carried out in base 2, the quotient bit of the integer division A div b has only two possible values: 0 or 1. Thus a simple way of performing the operation A div b consists of subtracting b from A and then testing the result: if the result of A−b is positive, then A div b=1, if the result of A−b is strictly negative, then A div b=0.

The complete division method can then be written in the following manner:

Input: $a=(0, a_{m-1}, \ldots, a_0)$ $b=(b_{n-1}, \ldots, b_0)$
Output: q=a div b and r=a mod b
$A=(0, a_{m-1}, \ldots, a_{m-n+1})$
For j=1 to (m−n+1), do:
   a <- $SHL_{m-1}(a, 1)$ ; σ <- carry
   A <-$SUB_n(A, b)$ ; σ <- σ OR carry
   if (¬σ=TRUE) then A <- $ADD_n(A, b)$ if not lsb(a)=1
End For

METHOD 1

In this method, and throughout the following, the following notations are used.

Speaking inaccurately, but in particular for reasons of clarity, and unless explicitly specified otherwise, the same name will be used for speaking of a register and its content. Thus register A will be spoken of in order to speak of the register containing the data item A.

The symbol "<-" and the notation y <- x are used to indicate the loading of the content of the register x into a register y, the content of which is also referred to as y.

A is a word of n bits corresponding to the content of the n most significant bits of the register initially containing the data item a. A is of course modified at each iteration, just like the register initially containing a.

σ indicates whether or not the subtraction has been performed wrongly (i.e. whether the quotient bit must be equal to 0 or to 1).

¬σ is the complement to 1 (also referred to as negation) of the variable σ. TRUE is a constant, equal to 1 in one example.

lsb(a) is the lowest weight bit of the number a, also referred to as the least significant bit of a.

$SHL_{m+1}(a, 1)$ is an operation of shifting to the left by 1 bit in the register of m+1 bits containing the data item a, the bit leaving the register being stored in the variable carry and a bit equal to 0 being entered as the least significant bit of the register initially containing the data a.

$ADD_n(A, b)$ is an operation of addition of the n bits of the number b to the n bits of the word A. It will be noted that the operation $SHL_n(a, 1)$ is equivalent to the operation $ADD_n(a, a)$. Naturally the addition $ADD_n(a, b)$ is performed by adding, in an appropriate addition circuit, the content of the two registers containing respectively A and b.

$SUB_n(A, b)$ is an operation of subtraction of the number b from the word A. Naturally the subtraction $SUB_n(A, b)$ is performed by subtracting, in an appropriate circuit, the content of a register containing the data item b from the content of the register containing the word A.

In summary, the method 1 performs the following steps:
if a <- $SHL_{m+1}(a, 1)$ generates a carry (σ=carry=1), this means that $a_m=1$ (before shifting) and therefore that b must be subtracted from A.

if $a_m=0$ (before shifting) and if A<- $SUB_n(A, b)$ generates a carry (carry=1), this means that A−b µ 0 before subtraction and therefore b must be subtracted from A.

if a<- $SHL_{m+1}(a, 1)$ does not generate a carry and if A<- $SUB_n(A, b)$ also does not generate a carry (that is to say if, after updating σ, σ is false (or ¬σ is TRUE, then this means that A−b<0 before subtraction and therefore that b would not have to be subtracted from A. In this case, the method performs an addition operation A<- $ADD_n(A, b)$ in order to restore the value of A.

The method 1 is sensitive to covert channel attacks. This is because, it is noted on method 1 that, at each iteration, according to the value of σ, that is to say according to the value of the quotient bit which will be obtained during the current iteration, either an addition $ADD_n(A, b)$ or a setting to 1 of the least significant bit of the register containing the data then a is performed. The use and duration of execution of these two operations are different and the trace that they leave during their implementation is also different. The overall trace left during an iteration therefore varies according to the result bit obtained during the said iteration. By measuring and studying for example the trace left by the component when the complete method is executed, it is then possible to determine bit by bit the value of the result bits.

Method 1 makes it possible to obtain both the result of the integer division (q=a div b) and the remainder of the integer division (r=a mod b), which is also the result of a modular reduction. Other known methods having the same drawbacks perform either a modular division alone, or a modular reduction alone. In general terms, a division method is fairly similar to a modular reduction method.

DESCRIPTION OF THE INVENTION

One aim of the invention is to make secure a method of implementing a division and/or a modular reduction.

For this purpose the invention proposes a cryptographic method during which there is performed an integer division of the type q=a div b and/or a modular reduction of the type r=a mod b, with q a quotient, a number of m bits, b a number of n bits, n less than or equal to m and $b_{n-1}$ non zero, $b_{n-1}$ being the most significant bit of the number b.

According to the invention, the method is characterised in that the number a is masked by a random number ρ before forming the integer division and/or the modular reduction.

The number a being masked by a random number, the trace (for example the energy consumption) left during the execution of the method is different at each execution, so that it is no longer possible to implement a differential covert channel attack.

The invention can be applied for example to method 1, which performs both a division and a modular reduction. The invention can more generally be applied to any method which performs one or other of these operations.

The random number ρ can be modified at each execution of the method, or simply after a predefined number of executions of the method. Where applicable, the said predefined number is preferably chosen relatively small, for example a number from 32 to 64 bits.

According to a preferred embodiment of the invention, in order to mask the number a, there is added, to the number a, b times the random number (a<- a +b*ρ). For this purpose, in concrete terms, the content of the register b is multiplied by the random number ρ and then added to the number a, and the result of the addition is then stored in the register initially containing the number a.

Then the integer division and/or the modular reduction required is next performed.

In the case where an integer division is performed, the result of the integer division performed with the number a masked in the form a+b*ρ is equal to a div b+ρ. In this case, after the integer division, the contribution made by the random number ρ in order to find the expected result of the integer division on the number a, that is to say a div b, is taken away from the result of the integer division.

In the case where modular reduction is performed, the result of the operation (a+b*ρ) mod b is equal to a mod b, the expected result of the modular reduction on the number a.

The invention also concerns an electronic component comprising means for implementing a method according to the invention, as described above. The programmed calculation means comprise in particular several registers for storing the numbers a and b.

Finally, the invention concerns a chip card comprising a component having the characteristics described above.

The invention claimed is:

1. A cryptographic method, comprising the steps of:
performing an integer division of a type q=a div b and/or a modular reduction of a type r=a mod b by a processor, where q is a quotient, a is a number containing m bits, b is a number containing n bits, with n less than or equal to m and $b_{n-1}$ is non-zero, $b_{n-1}$ being the most significant bit of the number b;

masking the number a by a random number ρ by the processor before performing the integer division and/or the modular reduction;

taking away the contribution made by the random number ρ from the result of the integer division after having performed the integer division; and generating encrypted or decrypted data by the processor in accordance with a result of the division and/or modular reduction.

2. A method according to claim 1, wherein, in order to mask the number a, b times the random number ρ (a<- a+b*ρ) is added to the number a.

3. A method according to claim 1, wherein, in order to take away the contribution made by the random number ρ, said random number ρ is subtracted from the result of the integer division.

4. A method according to claim 1, wherein the random number ρ is modified at each implementation of the method.

5. A method according to claim 1, wherein the random number ρ is modified after a predetermined number of implementations of the method.

6. An electronic component comprising means for implementing a method according to claim 1, said means comprising a plurality of registers for storing the numbers a and b.

7. A chip card comprising a component according to claim 6.

* * * * *